United States Patent
Moloney, Jr.

[15] 3,666,319
[45] May 30, 1972

[54] POWER OPERATED ARMREST

[72] Inventor: Earle F. Moloney, Jr., 2309 Longacre Lane, Palatine, Ill.

[22] Filed: Aug. 21, 1970

[21] Appl. No.: 65,924

[52] U.S. Cl. ................................................ 297/113, 297/330
[51] Int. Cl. ........................................................... A47c 7/54
[58] Field of Search ............... 297/113, 115, 330, 417, 334, 297/284, DIG. 10; 248/371, 394; 108/7, 20

[56] References Cited

UNITED STATES PATENTS

| | | | |
|---|---|---|---|
| 2,714,419 | 8/1955 | Killington | 297/113 |
| 3,273,877 | 9/1966 | Geller et al. | 297/284 X |
| 3,261,031 | 7/1966 | Gates | 297/DIG. 10 |
| 3,227,488 | 1/1966 | Kosbab et al. | 297/330 |
| 3,168,346 | 2/1965 | Rei, Jr. | 297/113 |
| 3,069,543 | 12/1962 | Sazavsky | 108/7 X |

*Primary Examiner*—Francis K. Zugel
*Attorney*—Kinzer, Dorn and Zickert

[57] ABSTRACT

A power operated armrest for a vehicle seat having a seat back with a recess into and out of which the armrest moves between retracted and horizontally extended position, includes a hinge unit between the armrest and seat and a reversible motor coupled to the hinge unit to drive the armrest between retracted and extended positions.

4 Claims, 11 Drawing Figures

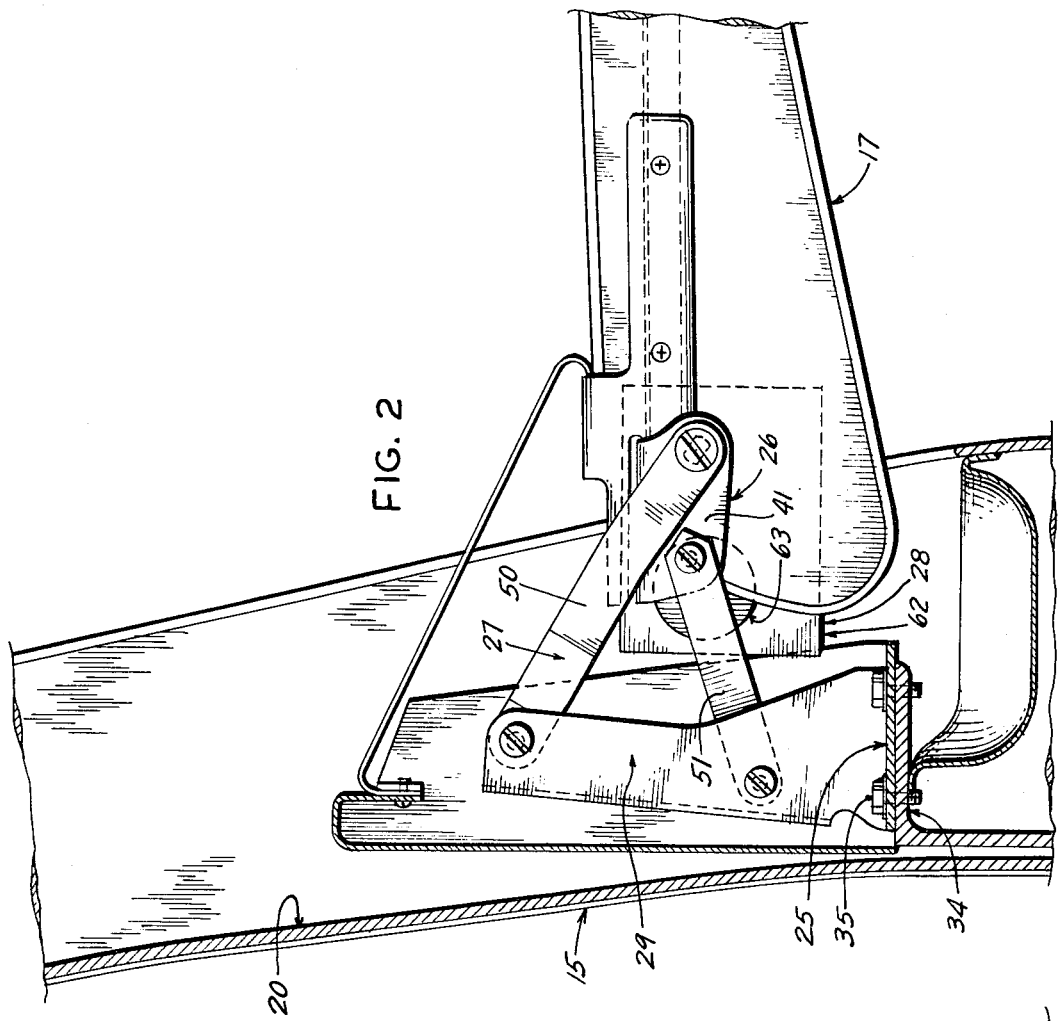
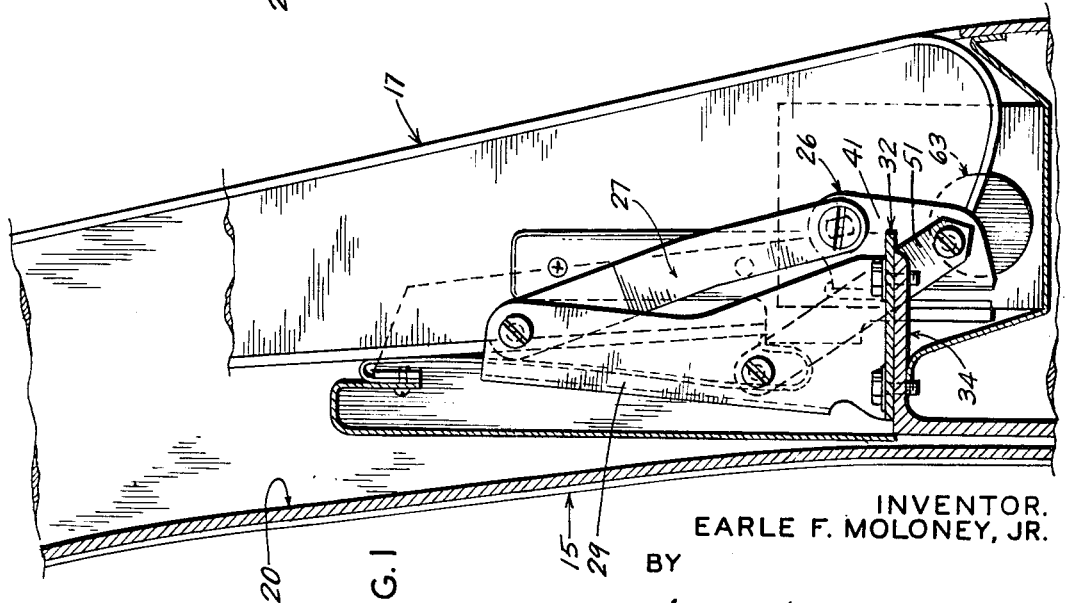
INVENTOR.
EARLE F. MOLONEY, JR.
BY
Kinzer, Dorn and Zickert
ATTORNEYS

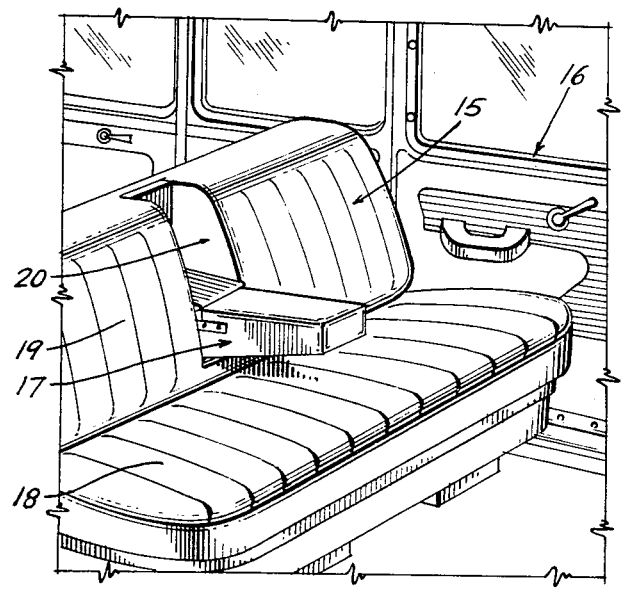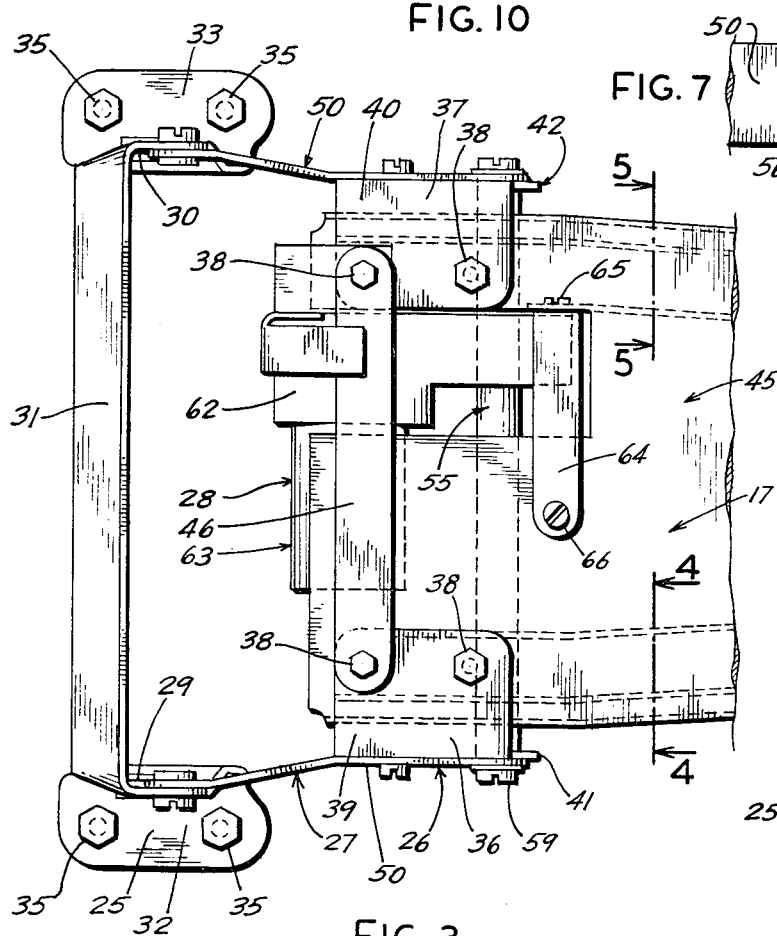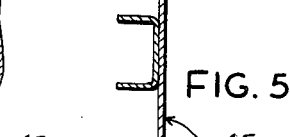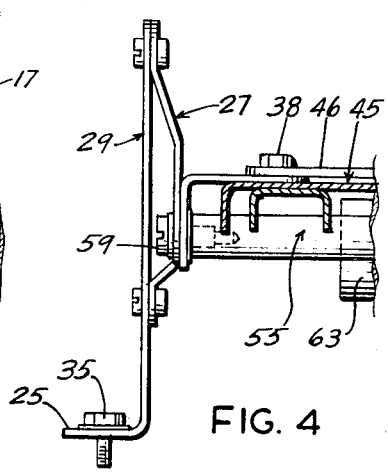

POWER OPERATED ARMREST

This invention relates in general to a foldable armrest for a vehicle seat, and more particularly to an armrest movable between a retracted position flush with the seat back and a horizontal position extending from the seat back, and still more particularly to a power operated armrest.

Heretofore, it has been known to have folding armrests in vehicles associated with a seat, such as illustrated in U.S. Pat. Nos. 3,168,346 and 3,191,995. Both patents illustrate armrests capable of being folded into the seat cushion. However, the folding operation is manually controlled.

With the advent of more emphasis being placed on safety in the construction and operation of vehicles, especially passenger automobiles, many safety devices have been developed. It can be appreciated that manually controlling the position of a folding armrest in the front seat of a vehicle by the driver when in motion requires diverting attention of the driver from the driving function, which is hazardous. The present invention overcomes this problem in providing a folding armrest that can be moved under power in response to the mere operation of a button or switch, thereby enhancing the safety of the driving operation.

It is therefore an object of the present invention to provide a new and improved folding armrest for a vehicle such as a passenger automobile, wherein power means is provided for controlling the armrest movements.

Other objects, features and advantages of the invention will be apparent from the following detailed disclosure, taken in conjunction with the accompanying sheets of drawings, wherein like reference numerals refer to like parts, in which:

FIG. 1 is a side elevational view of the power operated armrest according to the invention showing parts of the seat in which it is mounted in section, and illustrating the armrest in the up position;

FIG. 2 is a view similar to FIG. 1, but illustrating the armrest in the down position;

FIG. 3 is a top plan view of the mechanism supporting and operating the armrest;

FIG. 4 is a detailed sectional view taken substantially along line 4—4 of FIG. 3;

FIG. 5 is a detailed sectional view taken substantially along line 5—5 of FIG. 3;

FIG. 6 is a fragmentary plan view of one end of the drive shaft as removed from the assembly;

FIG. 7 is an end view of the drive shaft of FIG. 6 and illustrating the coaction of one of the hinge bars with the end of the drive shaft;

FIG. 8 is a fragmentary detailed plan view of one end of the drive shaft, showing some parts in section, and illustrating the assembly of the drive shaft relative to the hinge plate bearing and the hinge bar;

FIG. 9 is an end elevational view of the drive shaft assembly of FIG. 8;

FIG. 10 is a perspective view of the interior of the passenger vehicle having a folding armrest, and illustrating the armrest in the down or extended position; and FIG. 11 is a fragmentary perspective view of the armrest and seat shown in FIG. 10 and illustrating the armrest in the up or retracted position.

Referring now to the drawings, and particularly to FIGS. 10 and 11, a seat assembly 15 is illustrated within a passenger vehicle 16, and which includes a folding armrest 17. The seat assembly 15 includes generally a horizontal seat portion 18 and an upstanding seat back 19. A forwardly facing recess 20 is provided in the seat back 19 into which the armrest 17 may be moved or retracted to a flush position with the seat back as shown in FIG. 11, the armrest being shown in the down or extended position as shown in FIG. 10. Accordingly, when the armrest is in the up position as seen in FIG. 11, it will be in use, and when it is in the down or extended position as shown in FIG. 10, it can then be used by either the driver or a passenger on the passenger side.

While the folding armrest can be utilized in the front or back seats of a vehicle, the present application is primarily concerned with use of the folding armrest in the front seat, wherein the position of the armrest is controlled by the vehicle driver.

The mechanism of the invention for mounting the armrest and for operating the armrest between retracted and extended positions includes generally a hinge plate unit 25 mounted in fixed position on the seat 15, a hinge plate unit 26 secured to the armrest 17, a set of hinge bars 27 extending between the hinge plate units 25 and 26, and a motor-reduction gear assembly 28 carried on the armrest.

The hinge plate unit 25 includes parallel spaced and opposed hinge plates 29 and 30 interconnected by a cross plate 31. Mounting flanges 32 and 33 extend from the lower ends of the hinge plates 29 and 30, respectively, and are adapted to be set upon angle bars 34 which are in turn connected to the frame of the seat assembly 15. Suitable fasteners 35 anchor the hinge plate unit 25 to the seat by securing the mounting flanges 32 and 33 to the angle bars 34. Accordingly, the hinge plate unit 25 defines upstanding hinge plates 29 and 30 to which the set of hinge bars 27 may be pivotally connected.

The hinge plate unit 26 includes spaced armrest hinge plates 36 and 37 fastened to the frame of the armrest by fasteners 38. The hinge plates 36 and 37 respectively include mounting flanges 39 and 40 which are secured to the armrest and hinge plate portions 41 and 42 that provide for the pivotal connection of the set of hinge bars.

A metal pan 45 extends between the armrest hinge plates 36 and 37, and with the hinge plates is fastened to the armrest to further provide reinforcing of the hinged mounting to the armrest. Additionally, a cross bar 46 extends between the flanges 39 and 40 of the armrest hinge plates to reinforce the mounting arrangement.

The set of hinge bars includes an identical pair of upper hinge bars 50 and identical pair of lower hinge bars 51. Each of the bars are pivotally connected at opposite ends to the seat hinge plate and the armrest hinge plates. The upper pair of hinge bars 50 are pivotally connected at one end at the upper ends of the hinge plates 29 and 30, and pivotally connected at the other end to one end of the hinge plate portions 41 and 42. Similarly, the lower plate and hinge bars 51 are pivotally connected at one end to the seat hinge plates 29 and 30 at a point below the pivotal connection of the upper hinge bars 50, and pivotally connected at their other ends to the armrest hinge plates 41 and 42, at a point spaced from the pivotal connections of the upper hinge bars 50. The pivotal connections of the hinge bars to the hinge plates are such, as shown particularly in FIGS. 1 and 2, that the armrest 17 will fold into the recess 20 flush with the seat back when in the up or retracted position, FIG. 1, and will extend substantially horizontally when in the down or extended position, FIG. 2, for use as an armrest.

The motor-reduction gear assembly 28 is mounted on the armrest 17 with its output connected to the ends of the hinge bars 50 at the armrest through a drive shaft 55. In this respect the hinge bars are not pivotally connected to the armrest hinge plates like the lower hinge bars, although they pivot relative the hinge bars. The drive shaft is journalled in the hinge plates 41 and 42, and provided at its ends with flatted portions 56 that mate with sockets 57 formed in the ends of the hinge bars 50 so that the drive shaft will not rotate relative to the hinge bars but will cause transmission of a force generated through the motor-reduction gear assembly 28 to be applied to the armrest. The ends of the drive shaft are provided with a tapped bore 58 for receiving a fastener 59 that holds the hinge bars in place on the ends of the drive shaft. To further prevent lateral shifting of the drive shaft 55, a ring groove 60 is provided at each end spaced inwardly of the end to receive a retaining ring 61, FIGS. 6 to 8, the retaining ring being on the inner side of the hinge plates.

The motor-reduction gear assembly 28 includes a reduction gear 62 and a reversible motor 63.

The drive shaft 55 is suitably coupled to the output of the reduction gear 62, and the input to the reduction gear is connected to the shaft of the reversible motor 63. In order to prevent rotation of the motor-reduction gear assembly about the drive shaft 55, a retaining strap 64 is secured at one end to the reduction gear 62 by the fastener 65, and at the other end to the metal pan 45 by fastener 66. Accordingly, energization of the motor 63 imparts a force through reduction gear 62 and the drive shaft 55 to the hinge bars 50 and the armrest hinge plates 36 and 37 to cause rotation of the drive shaft relative the hinge plates and movement of the armrest between retracted or up position and extended or down position. While the motor-reduction gear assembly is shown mounted on the armrest, it should be appreciated that it could be mounted on the seat and impart a force through a drive shaft and through the hinge bars 50 or 51 to cause the armrest to move between retracted and extended positions.

While not shown, it should be appreciated that a control button or switch for operating the motor 63 may be located on a console mounted on the adjacent door, adjacent the steering wheel, or on the dash, and in any event it would be mounted in a convenient location for easy access by the driver.

It will be understood that modifications and variations may be effected without departing from the scope of the novel concepts of the present invention, but it is understood that this application is to be limited only by the scope of the appended claims.

This invention is hereby claimed as follows:

1. A power operated armrest for a seat in a vehicle, wherein the seat includes a seat back having a forwardly facing recess into and out of which the armrest is movable between a retracted position flush with the seat back and a generally horizontal position extending forwardly from said seat back, said armrest comprising, an armrest, a hinge mount fixed to the seat within the recess, a hinge mount fixed to the armrest and movable therewith, first and second pairs of hinge bars hingedly mounting the armrest hinge mount to the seat hinge mount, a reversible motor fixed to said armrest hinge mount, a motor shaft for the motor, a reduction gear assembly having its input connected to the motor shaft and its output connected to a drive shaft journalled in said armrest hinge mount, and means keying the drive shaft to one of the pairs of hinge bars to prevent relative rotation therewith, whereby energization of the motor drives the drive shaft with the hinge bar keyed thereto relative to the armrest hinge mount and causes rotation between the other hinge bars relative to the armrest hinge mount and movement of the armrest between retracted and horizontal positions.

2. The combination defined in claim 1, wherein the pivot points on said seat hinge mount of said first pair of hinge bars are vertically spaced above the pivot points of the second pair of hinge bars.

3. The combination defined in claim 2, wherein the pivot points on said armrest hinge mount of said first pair of hinge bars are vertically spaced above the pivot points of the second pair of hinge bars when the armrest is in retracted position.

4. The combination defined in claim 3, wherein the pivot points of the first and second pairs of hinge bars are spaced further apart on the seat hinge mount than on the armrest hinge mount.

* * * * *